United States Patent [19]

Kijima et al.

[11] Patent Number: 4,833,001
[45] Date of Patent: May 23, 1989

[54] GLASS SUBSTRATE FOR A MAGNETIC DISC AND PROCESS FOR ITS PRODUCTION

[75] Inventors: Takashi Kijima; Jyun Matsui; Takaaki Sera; Takayuki Kobayashi, all of Yokohama; Shunji Takakusa, Tokyo; Hiroshi Ogata, Fujisawa, all of Japan

[73] Assignee: Asahi Glass Company Ltd., Tokyo, Japan

[21] Appl. No.: 105,612

[22] Filed: Oct. 8, 1987

[30] Foreign Application Priority Data

Oct. 9, 1986 [JP] Japan ................ 61-239249
Dec. 12, 1986 [JP] Japan ................ 61-294927
Aug. 4, 1987 [JP] Japan ................ 60-193731
Sep. 9, 1987 [JP] Japan ................ 62-224034

[51] Int. Cl.$^4$ ............................................. B32B 3/00
[52] U.S. Cl. ......................................... 428/141; 65/31; 156/646; 156/663; 427/129; 428/426; 428/694; 428/900

[58] Field of Search ........... 428/141, 426, 694, 900; 427/128; 156/646, 663; 65/31

[56] References Cited

U.S. PATENT DOCUMENTS

| 3,466,156 | 9/1969 | Peters et al. | 427/131 |
| 3,516,860 | 6/1970 | Simmons | 427/132 |
| 4,326,229 | 4/1982 | Yanagisawa | 427/131 |
| 4,411,963 | 10/1983 | Aine | 428/694 |
| 4,415,404 | 11/1983 | Riegl | 156/663 |
| 4,608,293 | 8/1986 | Wada et al. | 427/129 |
| 4,645,703 | 2/1987 | Suzuki et al. | 428/141 |
| 4,716,078 | 12/1987 | Kishine et al. | 427/129 |

*Primary Examiner*—Paul J. Thibodeau
*Attorney, Agent, or Firm*—Oblon, Fisher, Spivak, McClelland & Maier

[57] ABSTRACT

A glass substrate for a magnetic disc having a finely and isotropically roughened surface, wherein the maximum height $R_{max}$ of the surface roughness is substantially not higher than 700 Å at a standard length of 250 μm and substantially not less than 50 Å at a standard length of 50 μm.

11 Claims, 3 Drawing Sheets

L: Standard length
$R_{max}$: Maximum height of a sampled portion corresponding to the standard length L.

GLASS SUBSTRATE FOR A MAGNETIC DISC AND PROCESS FOR ITS PRODUCTION

The present invention relates to a glass substrate for a magnetic disc and a process for its production.

A structure comprising a substrate for a magnetic disc and magnetic and protective layers formed thereon by such a process as sputtering, plating or vapor deposition, is called a magnetic recording medium (hereinafter referred to simply as a medium).

A magnetic disc drive unit comprises, as essential components, such a medium and a magnetic head for reading and writing information (hereinafter referred to simply as a head). At the initiation of the operation, the head and the medium are in contact with each other. Then, the medium is driven to rotate at a predetermined speed to form a space of an air layer between the head and the medium, and the reading and writing operation is conducted in this state. At the termination of the operation, rotation of the medium stops, and the head and the medium return to the initial states where they are in contact with each other. This is so-called a contact-start-stop (CSS) method.

The frictional force created between the head and the medium at the time of the initiation or termination of the magnetic disc drive wears the head and the medium off and thus causes a deterioration of the magnetic characteristics. If the surface of the medium is smooth, it is likely that the head sticks to the medium. This sticking phenomenon is more likely to occur under a high humidity condition where the medium absorbs moisture on its surface. If the magnetic disc drive is started up for operation under such a condition, a substantial resisting force will be created between the head and the medium, whereby the head is likely to be damaged or the medium is likely to be broken. This is so-called head-stick or head-crush.

In general, glass is hard and excellent in its surface smoothness and has high deformation resistance and few surface defects, and as such, is expected to be useful as a magnetic disc substrate suitable for high density recording.

However, a medium made with a glass substrate has problems in connection with the above-metioned frictional wearing off and head-stick in that because of the excellent surface smoothness of glass, the medium made with such a glass substrate has a larger contact surface area between the head and the medium than a medium made with a substrate having an inferior surface smoothness, and thus leads to a higher frictional resistance, an increase of wearing off and an increase of the sticking phenomenon.

In order to overcome these drawbacks, it has been proposed to use a substrate having the surface finely roughened by a mechanical means so that the frictional force and the sticking force between the head and the medium are thereby reduced.

Further, it has been proposed to roughen the surface of a ceramic or glass substrate by chemical etching (Japanese Unexamined Patent Publications No. 38720/1985 and No. 136035/1985).

It is an object of the present invention to solve the above-mentioned problems inherent to the glass substrate for a magnetic disc such as frictional wearing off and head-stick.

The present invention has been made to reduce the frictional force and to improve the frictional wearing resistance and head-stick resistance without adversely affecting the magnetic characteristics and thus to solve the above-mentioned problems.

Thus, the present invention provides a glass substrate for a magnetic disc having a finely and isotropically roughened surface, wherein the maximum height $R_{max}$ of the surface roughness is substantially not higher than 700 Å at a standard length of 250 μm and substantially not less than 50 Å at a standard length of 50 μm.

The present invention also provides a glass substrate for a magnetic disc having a finely and isotropically roughened surface on which a magnetic layer is to be formed by a process such as sputtering, plating or vapor deposition, wherein mountains constituting the surface roughness having heights within a range of from 50 to 700 Å are formed with pitches within a range of from 0.1 to 10 μm.

Further, the present invention provides a process for producing a glass substrate for a magnetic disc, which comprises applying chemical etching treatment to a glass surface to form a surface roughness and optionally applying mechanical polishing treatment to the roughened surface to obtain a surface roughness wherein the maximum height $R_{max}$ of the surface roughness is substantially not higher than 700 Å at a standard length of 250 μm and substantially not less than 50 Å at a standard length of 50 μm.

The surface roughness used in this specification is in accordance with JIS (Japanese Industrial Standard) B 0601-1982 "Definitions and Designation of Surface Roughness" and is obtained by measuring it by means of instruments for the measurement surface roughness by the stylus method at a sufficiently slow scanning speed by using a stylus having a radius of 2.5 μm and a weight of 25 mg.

Now, the present invention will be described in detail with reference to the preferred embodiments.

From the study of the problems in the use of glass as a substrate for a magnetic disc, the present inventors have had the following view.

(1) The higher the level of smoothness of the substrate, the better the magnetic properties of the magnetic layer. In order to overcome the modulation, bit shift or defects for high density recording with a thin layer medium or in order to minimize the flying height of the head, the maximum height $R_{max}$ of the surface roughness of the substrate should be as low as possible ($R_{max}$ and the standard length are in accordance with JIS B 0601).

(2) If the glass substrate has microcracks or scratches visible by naked eyes, such portions are susceptible to corrosion under a high temperature and high humidity condition for a durable test after the preparation of the medium.

(3) The smaller the contact surface area of the head and the medium, the better the stiction properties (as evaluated by the static friction coefficient) as an index for the frictional properties. Accordingly, the surface of the medium is preferably as rough as possible.

(4) In a CSS test wherein rotation and stopping of a medium are repeated so that a cycle of contact-flying-contact of the head is repeated to see the change in the friction coefficient, the contact surface area of the head and the medium should better be large to some extent, and the CSS properties tend to deteriorate if the contact surface area is too small or too large.

The roughness formed on the surface of the substrate of the present invention is required to have $R_{max}$ of not higher than 700 Å at a standard length of 250 μm to meet the magnetic properties required for a magnetic disc. Here, the magnetic properties include modulation errors, missing bits, bit shifts and S/N ratios. In general, these magnetic properties are better when the substrate is smooth within a range where the CSS properties and the static frictional properties are not deteriorated. On the other hand, if the substrate is too smooth, the above-mentioned stiction properties and the head stick resistance will be poor. Therefore, $R_{max}$ is required to be not less than 50 Å at a standard length of 50 μm.

Thus, the roughness formed on the substrate should properly have $R_{max}$ of not less than 50 Å at a standard length of 50 μm, preferably 10 μm and not higher than 700 Å, preferably not higher than 400 Å at a standard length of 250 μm.

Figure 4:
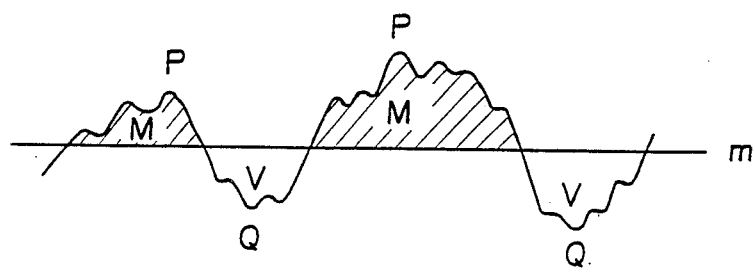
FIG. 4 is a diagrammatic view of the cross sectional profile according to JIS B 0601-1982.

For the purpose of the present invention, the surface roughness is measured in accordance with JIS B 0601-1982. FIG. 4 is a diagrammatic view of a cross sectional profile of the surface roughness. The hatched portion represents a mountain M which has only one top P. Likewise, a valley V has only one bottom Q. Reference symbol m represents a mean line. The maximum height ($R_{max}$) of the surface roughness, the height of each mountain and the pitch of the mountains are determined based on the measurement conducted by means of a surface roughness meter having a stylus with a radius of 2.5 μm with a stylus load of 25 mg at a sufficiently slow scanning speed. The shapes of the peaks of the mountains of the surface roughness are determined by the microscopic observation of the surface from an oblique direction by means of a scanning electron microscope having a high resolution or by the measurement by means of a surface roughness meter using an electron beam.

Figure 5:
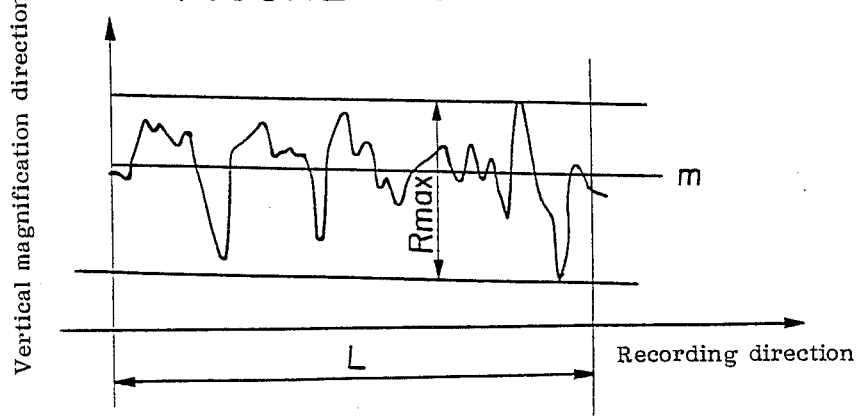
FIG. 5 is a diagrammatic view illustrating the maximum height ($R_{max}$) of the surface roughness.

According to JIS B 0601-1982, the maximum height ($R_{max}$) of the surface roughness is determined in such a manner that as shown in FIG. 5, a portion corresponding to the standard length L is sampled from the cross sectional profile, and the sampled portion is sandwiched by two straight lines parallel to the mean line m, whereupon the distance between the two straight lines is measured in the vertical magnification direction of the cross sectional profile, and the maximum height is represented by the measured value.

Now, the glass substrate of the present invention will be described with reference to the drawings, particularly with respect to the heights of mountains and the pitches of the mountains.

Figure 1:
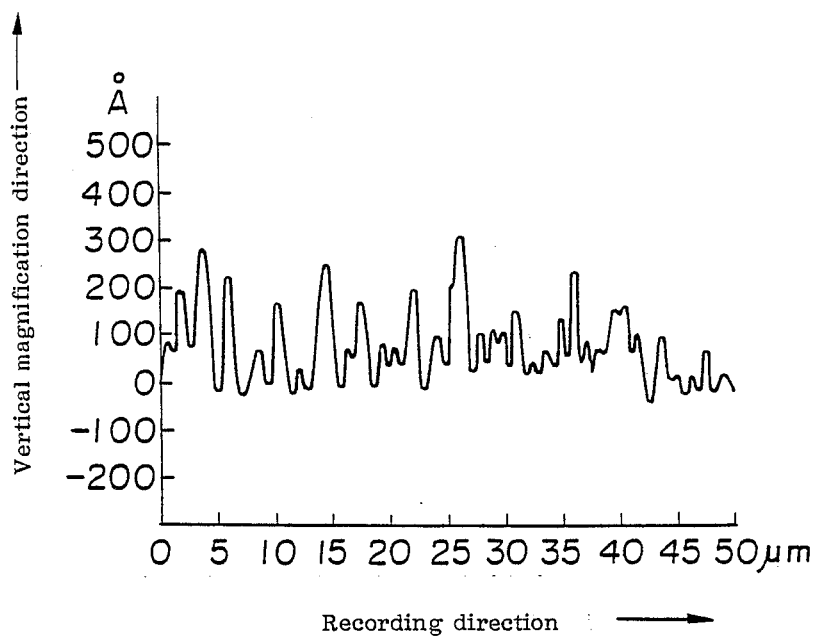
FIG. 1 is a cross sectional profile showing the surface roughness of an example of the present invention.
Figure 2:
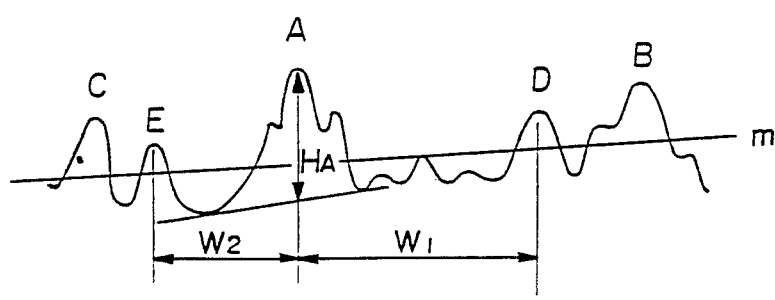
FIGS. 2 and 3 are diagrammatic views illustrating the heights of mountains of the surface roughness and the pitches of the mountains, wherein m is a mean line of the cross sectional profile.

FIG. 1 is a cross sectional profile of the surface roughness of an example of the present invention. FIG. 2 is a diagrammatic view illustrating the method for the measurement of the heights of the mountains and the pitches of the mountains. Firstly, a mean line m of the cross sectional profile (a straight line to minimize the sum of the squares of the deviations to the cross sectional profile) is drawn. Referring to the mountain A, two peaks at the shoulders of the mountain belong to the mountain A, and the height of the mountain A is represented by the distance $H_A$ between the top of the mountain and the straight line connecting the two bottoms at both sides of this mountain. Mountains adjacent to the mountain A are D and E, and the pitches of these mountains are represented by $w_1$ and $w_2$, respectively.

The heights of the mountains are preferably within a range of from 50 to 700 Å, more preferably from 100 to 400 Å. The pitches of the mountains are preferably not more than 50 μm, and more preferably within a range of from 0.1 to 10 μm.

The above ranges of the heights and the pitches of the mountains are within the range of the surface roughness whereby $R_{max}$ as measured in accordance with JIS B 0601 is substantially not higher than 700 Å at a standard length of 250 μm and substantially not less than 50 Å at a standard length of 50 μm.

Figure 3:
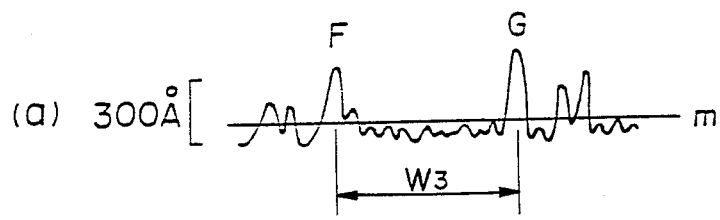
Figure 3:
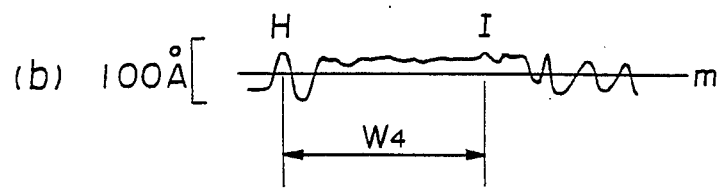

FIGS. 3(a) and 3(b) illustrate the cases wherein the pitches of the mountains are large. In a case where a wide valley is formed between mountains F and G as shown in FIG. 3(a), the head is likely to collide with mountain peaks to damage the protective layer presumably because stability of the head during the sliding and flying is impaired. The present inventors have found that if the pitch $w_3$ exceeds 50 μm, such damage to the protective layer is observed in most cases, and no such a damage is observed when the pitch is within 10 μm. In a case where a wide range between mountains H and I is rather flat with e.g. only one deep valley exceeding a depth of 50 Å, as shown in FIG. 3(b), the head is likely to stick to the medium, the stiction is large, and the head stick resistance is poor. The present inventors have found that when the pitch $w_4$ exceeds 50 μm, the stiction value becomes at least 0.5, and head crush or a damage to the protective layer are observed in many cases, and there is no such problems when the pitch $w_4$ is within 5 μm.

When $R_{max}$ is less than 50 Å at a standard length of 50 μm, the pitches of the mountains are more than 50 μm, such being undesirable as described above.

It has been found also that when the pitches of the mountains are small and the heights of the mountains are only at a level of 50 Å, particularly when the pitches are well below 0.1 μm, the stiction tends to be too high presumably because, in a strict sense, the slider surface of the head and the tops of the mountains are not in point contact but in surface contact because they are in contact with each other with adsorbed moisture or a lubricant interposed therebetween, and if the heights of mountains are low and the pitches of the mountains are small, the overall contact surface area increases.

A profile as shown in FIG. 1 is obtainable in any direction on the surface of the substrate. Namely, in the present invention, the surface roughness is isotropic or random i.e. without anisotropy. In the case of an aluminum substrate for a magnetic disc, it is common that an anisotropy is provided so that the roughness is less in the circumferential direction, while the roughness is larger in the radial direction. In the case of a glass substrate, it is possible to provide such an anisotropy in the surface roughness. However, glass hardly undergoes plastic flowability as compared with aluminum, and even after the surface is roughened by an abrasive grain, mountain tops of the roughened surface are nearly on the same plane. Therefore, in order to reduce the stiction, it used to be necessary to excessively roughen the surface as compared with the caes of the aluminum substrate. It may be that even if the surface is roughened in the radial direction, the surface is flat in the circumferential direction and the contact surface area with head is large. Further, it is undesirable to increase the roughness $R_{max}$ since the magnetic properties will be thereby impaired. Whereas the present inventors have found that when the surface roughness is formed without anisotropy, a sufficiently low stiction value is obtained even when $R_{max}$ is smaller than that of the aluminum substrate. This is believed attributable to the fact that with the surface roughness without anisotropy, the contact surface area with the head is smaller. On the other hand, it is conceivable that as the contact surface area decreases, the load of the head or the impact force applied to the peaks of the surface roughness increases. Nevertheless, excellent CSS characteristics are obtainable. This is believed attributable to the fact that as compared with the Ni-P plated layer used for the aluminum substrate, glass is hardly deformed and highly durable against the load or the impact force.

With a medium prepared by using a glass substrate of the present invention having a surface roughness without anisotropy, no substantial increase of the defects was observed even when the track density was increased for high density recording. With an aluminum substrate, a substantial increase of defects is observed as the track density is increased, presumably due to wide groove-like recesses in the circumferential direction. It is believed that good results can be obtained with the substrate of the present invention because no such wide continuous recesses exist on the substrate of the present invention.

The surface roughness as described above is formed usually substantially uniformly over the entire surface of the substrate. However, mountains having a height or pitch exceeding the above-mentioned ranges may be present so long as the object of the present invention can be accomplished without trouble. Further, there may be some portions on the surface where no roughening treatment has been applied.

The glass used for the present invention is preferably a silicate glass containing $SiO_2$ as the main component. Here, the glass disc prior to the application of roughening treatment on the surface will be referred to as a base disc, while a disc-shaped glass having a roughened surface to be used for a medium will be referred to as a substrate for distinction from the base disc.

The base disc is preferably made of a glass containing $SiO_2$, such as a soda lime silicate glass, an alkali-containing borosilicate glass, an alkali-containing aluminoborosilicate glass, an alkali aluminosilicate glass, an alkali-free glass, an air-cooled or liquid-cooled physically strengthened glass, a chemically strengthened glass or a crystallized glass. It is particularly preferred to use a glass containing at least about 40% of $SiO_2$ by the weight % of the constituting oxides.

Now, a process for producing the glass substrate for a magnetic disc according to the present invention will be described.

(1) Chemical etching wherein a gas containing hydrogen fluoride is contacted to the glass surface.

Figure 6:
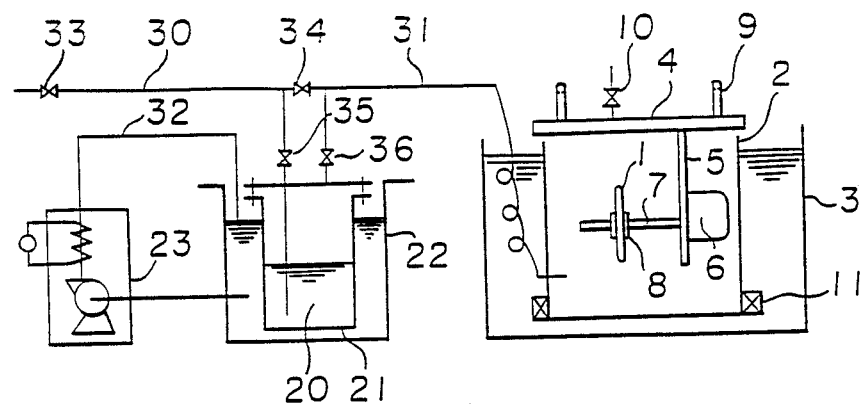
FIG. 6 is a diagrammatic view illustrating the apparatus for chemical etching treatment wherein a gas containing hydrogen fluoride is contacted to the glass surface.

This process will be described with reference to FIG. 6. In FIG. 6, an aqueous solution 20 of hydrofluoric acid was filled in a tank 21, and the temperature of the aqueous solution was maintained at a constant level. In a separately provided constant temperature water tank 3, a reaction tank 2 was installed, and the temperature was maintained at a constant level.

On the other hand, a motor 6 and a shaft 7 were fixed to a cover 4. A glass base disc 1 preliminarily maintained at a prescribed temperature was attached to the shaft 7 by a clamp 8 and set at the predetermined position in the reaction tank. Then, valves 33 and 34 were opened to introduce nitrogen gas to the reaction tank at a rate of 20 liter/min via pipe lines 30 and 31, and the glass base disc 1 was maintained for from 3 to 8 minutes in the reaction tank until it reached to a predetermined temperature. Then, the base disc was rotated at a speed of about 1,300 rpm, and then the valve 34 was closed and valves 35 and 36 were opened to introduce nitrogen gas into a hydrofluoric acid solution 20, and a gas mixture of HF, $H_2O$ and $N_2$ thus obtained was introduced into the reaction tank. A part of this gas mixture containing hydrogen fluoride reacted on glass to form a roughness on the glass surface, and formed transparent silicon tetrafluoride gas $SiF_4$ or a mist of hydrosilicofluoric acid $H_2SiF_6$ in the form of a white fume, which was discharged from the reaction tank through an outlet 10 and sent to an installation for treating a waste hydrogen fluoride gas, via a hood not shown. After conducting the reaction for a predetermined period of time, the valves 35 and 36 were closed, and then the valve 34 was opened to purge HF in the reaction tank with nitrogen gas. Then, the glass was taken out of the tank by opening the cover with a handle 9.

Now, Examples will be given wherein by using the above-mentioned apparatus and in accordance with the above described process, gas mixtures containing from 0.01 to 10 mol % of hydrogen fluoride in an inert gas were contacted to glass discs maintained at temperatures of from 5° to 90° C. to roughen the glass surfaces.

Table 1 shows the results of an Example wherein base discs having an outer diameter of 130 mm made of a glass base sheet of soda lime silicate glass containing about 71% by weight of $SiO_2$ were used. The base disc was preliminarily subjected to fine polish on both sides to bring the thickness to about 1.905 mm, followed by washing and drying.

It is evident from Table 1 that it is possible to form a surface roughness suitable for a magnetic disc substrate within wide ranges of the glass temperature and the HF concentration in the gas mixture by properly selecting the treating time. However, it has been found from the results of the experiments that if the glass temperature is too high, $R_{max}$ hardly increases and tends to be smooth after etching, and if the glass temperature is too low, $R_{max}$ tends to be too high and a surface roughness exceeding 1,000 Å is likely to form. This is believed to be related to the fact that the lower the glass temperature, the higher the adsorption of the ambient moisture.

TABLE 1

| | Soda lime silicate glass (1) | | | | |
|---|---|---|---|---|---|
| Experiments | HF concentration in the gas mixture (mol %) | Glass temp. (°C.) | Treating time | Surface roughness $R_{max}$(Å) | Pitch of mountains (μm) |
| 1 | 0.01 | 30 | 3 min | about 50 | about 3 |
| 2 | 0.03 | 30 | 3 min | about 300 | about 3 |
| 3 | 0.3 | 30 | 3 min | about 800 | about 3 |
| 4 | 3 | 30 | 20 sec | about 650 | about 3 |
| 5 | 10 | 30 | 5 sec | about 600 | about 4 |
| 6 | 0.03 | 10 | 3 min | about 1000 | about 10 |
| 7 | 3 | 60 | 1 hr | about 250 | about 4 |

As another Example, Table 2 shows the results of the experiments conducted in the same manner as in the preceeding Example by using discs having an outer diameter of 130 mm and a thickness of about 1.905 mm made of a glass base disc of an aluminoborosilicate glass containing about 72% of $SiO_2$ and about 7% of an alkali metal. It was found that as compared with the case of the soda lime silicate glass in the preceeding Example, the glass temperature should be higher by about 15° C. for the same HF concentration in order to obtain the above-mentioned surface roughness suitable for the magnetic disc substrate.

TABLE 2

| | Aluminoborosilicate glass (alkali content: 7%) | | | | |
|---|---|---|---|---|---|
| Experiments | HF concentration in the gas mixture (mol %) | Glass temp. (°C.) | Treating time (min) | Surface roughness $R_{max}$(Å) | Pitch of mountains (μm) |
| 1 | 0.03 | 15 | 3 | about 600 | about 3 |
| 2 | 0.03 | 30 | 3 | about 450 | about 3 |
| 3 | 0.03 | 45 | 3 | about 300 | about 3 |
| 4 | 0.03 | 60 | 3 | about 70 | about 3 |

As a further Example, Table 3 shows the results of the experiments wherein a borosilicate glass containing about 55.5% by weight of $SiO_2$ and no substantial alkali metal was used as the base disc. The outer diameter and the thickness of the discs were the same as the preceeding Examples. With this glass, the surface roughness of the present invention suitable for a disc substrate was obtained at a glass temperature of 60° C. for a treating time of 3 minutes when the HF concentration was 0.03 mol %.

TABLE 3

| | Borosilicate glass (alkali content: 0.05%) | | | | |
|---|---|---|---|---|---|
| Experiments | HF concentration in the gas mixture (mol %) | Glass temp. (°C.) | Treating time (min) | Surface roughness $R_{max}$(Å) | Pitch of mountains (μm) |
| 1 | 0.03 | 45 | 3 | about 500 | about 3 |
| 2 | 0.03 | 60 | 3 | about 300 | about 3 |

As a still further example, Table 4 shows the results of experiments wherein the mixed gas consisting essentially of moisture-regulated air and pure hydrogen fluoride gas which is obtained from a hydrogen fluoride gas cylinder maintained at a temperature of not less than 19.5° C. which is the boiling point of hydrogen fluoride, was contacted to base discs made of soda lime silicate glass containing about 72.5% by weight of $SiO_2$.

It is evident from the results that when the moisture content in the air is small, the change in $R_{max}$ is not substantial even if the moisture concentration is changed, but where the moisture content in the air is 3 mol % (which corresponds to a relative humidity in the air at 30° C. of RH=72%), frost formed in one minute of the treating time under the conditions of the experiment, and it is impossible to form a surface roughness suitable for a glass substrate for a magnetic disc. Namely, the moisture in the glass mixture containing hydrogen fluoride should be not higher than about 70% by relative humidity.

Needless to say, the moisture in the gas mixture containing hydrogen fluoride should be controlled to a level of not higher than 70% by relative humidity also in the above-mentioned method wherein an aqueous hydrofluoric acid solution is employed. In such a case, the control of the relative humidity can be conducted by maintaining the concentration and the temperature of the aqueous hydrofluoric acid solution at predetermined levels. Namely, the concentration is preferably within a range of from 10 to 50% by weight, and the temperature is preferably within a range of from 5° to 40° C. The higher the concentration of the hydrofluoric acid solution and the lower the temperature of the solution, the lower the relative humidity of the gas mixture. Inversely, the lower the concentration and the higher the temperature of the solution, the higher the relative humidity.

TABLE 4

| | Soda lime silicate glass (2) | | | | | |
|---|---|---|---|---|---|---|
| Experiments | HF concentration in the gas mixture (mol %) | Moisture content in the air (mol %) | Glass temp. (°C.) | Treating time (min) | $R_{max}$ (Å) | Pitch or mountains (μm) |
| 1 | 0.03 | 0.1 | 30 | 3 | about 150 | about 5 |
| 2 | 0.03 | 0.3 | 30 | 3 | about 250 | about 5 |
| 3 | 0.03 | 0.9 | 30 | 3 | about 500 | about 4 |
| 4 | 0.03 | 3 | 30 | 1 | >10000 | about 10 |

The surface roughness formed in experiment 2 in Table 1 had a maximum height $R_{max}$ of mountains of about 300 Å and a pitch of mountains of about 3 μm. A Co alloy magnetic layer was formed on this substrate by sputtering, and a carbon protective layer and a lubricant layer were further formed thereon. Then, the CSS characteristics, the head stick resistance, the S/N ratio and the missing pulse were evaluated.

The CSS characteristics were satisfactory even after the test was repeated 70,000 times under the evaluation standard such that the characteristics are unacceptable if the static friction coefficient after the test exceeds 0.5 or if the output voltage after the test is below 90%.

The head stick resistance was evaluated by measuring the static friction coefficient between the head and the medium while maintaining the head and the medium in contact with each other under a high temperature high humidity atmosphere of 60° C. at a relative humidity of 90%, whereby the static friction coefficient was as low as under a normal condition, thus indicating no particular problem.

The S/N ratio (signal/noise ratio) was excellent at a level of 35 dB.

The missing pulse (a decrease in the output in the reading out of the written information, due to fine defects on the surface of the medium) was less than 2/surface at a threshold value of 70%.

(2) Chemical etching wherein an aqueous solution containing a fluorine compound is conducted to the glass surface.

A solution mixture of an aqueous potassium fluoride solution and hydrofluoric acid is used as a chemical etching solution. The concentration of hydrofluoric acid is preferably within a range of from 1 to 20N, more preferably from 6 to 14N, whereby the surface roughness can be formed with good reproducibility. The concentration of the aqueous potassium fluoride solution is preferably within a range of from 1 to 10N, more preferably 3 to 7N.

If an aqueous hydrofluoric acid solution containing no potassium fluoride is used or if a solution containinig sodium fluoride instead of potassium fluoride is used, the distance between mountains tends to be too wide, and it tends to be difficult to uniformly form mountains of at least 50 Å with a pitch of within 10 μm.

(3) Chemical etching treatment of the glass surface for roughing, followed by mechanical polishing treatment of the roughened surface.

Here, the chemical etching treatment is a method of chemically forming a fine roughness having no anisotropy on a glass surface by applying a fluoride solution or vapor to the glass surface. As the fluoride solution, an aqueous solution containing e.g. hydrofluoric acid or hydrofluoric acid and potassium fluoride may be mentioned, and as the fluoride vapor, a vapor of e.g. hydrogen fluoride may be mentioned.

Figure 7:
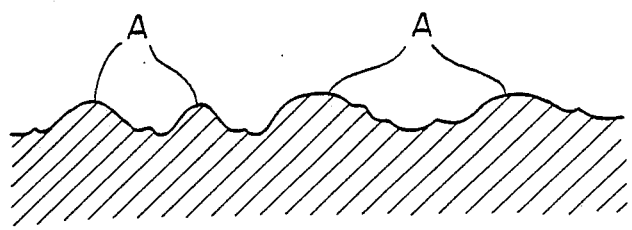
FIGS. 7 and 8 are cross sectional views of the surface roughness of glass substrates taken in perpendicular to the main planes of the substrates.
Figure 8:
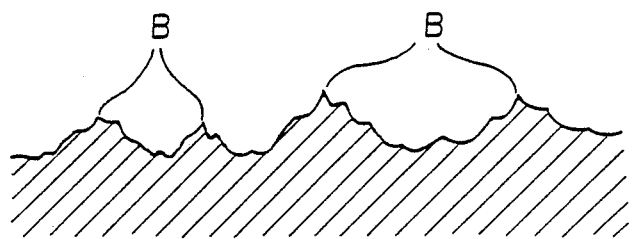

In the CSS test, if the contact surface area between the head and the medium is too small, the protrusions on the medium will be damaged by the concentrated load, whereby the lubricant and the protective layer are likely to be scraped off and eventually the head will be in direct contact with the magnetic layer. The medium reached this stage shows a sharp increase of the friction coefficient, and an increase of the missing pulse or a decrease of the the output, i.e. deterioration of the CSS characteristics will be brought about. Microscopically, the heights of protrusions of the roughened surface of the substrate formed by chemical etching treatment are non-uniform, and the slider surface of the head is considered to be in contact with the protrusions usually only at several to several tens of points, whereby it may happen that poor results in the CSS test are brought about by the above-described mechanism. Whereas, among the glass substrates prepared by chemical etching treatment, there were some wherein the friction coefficient was not higher than 0.5 even after the CSS test was repeated 30,000 times, and from the close examination of the surface, the peaks of the mountains of the roughened surface were found to have a rounded shape as shown at A in FIG. 7. On the other hand, in the discs wherein the friction coefficient exceeded 0.5 after the CSS test was repeated not more than 1,000 times, the peaks of the mountains of the roughened surface of the substrate were found to be angular or sharp as shown at B in FIG. 8.

According to the experiments conducted by the present inventors, the most influential factor is the surface condition of the base disc, and the results of the CSS test were constant with media using the substrates obtained by the chemical etching treatment conducted under the same conditions immediately after the base discs were polished, but the CSS test results were found to be inconsistent with samples prepared under the same conditions by using the base discs left for a number of days after polishing. It may be a natural consequence that in the chemical etching treatment, the shape of the resulting surface roughness is influenced by the surface condition of the glass prior to the treatment. However, such inconsistency is undesirable for a practical production line.

The present inventors have polished a roughened surface of a chemically etched substrate with the peaks of mountains of the roughened surface being angular, gently with a slight load by a polishing machine with a pad. The cross sectional shape of the surface roughness thus obtained was observed in an enlarged scale, whereby the peaks of mountains were found to be rounded. The degree of the mechanical polishing is just enough to have the peaks of the mountains slightly rounded so that no anisotropy will be created in the roughness by this mechanical polishing.

According to the study by the present inventors, good results were obtained when $CeO_2$, $ZrO_2$ or colloidal silica having an average diameater of not more than 10 μm was used as the polishing particles supplied to the polishing machine. Namely, unless coarse polishing particles such as SiC, $Al_2O_3$ or diamond are used, deep microcracks will not be formed by the polishing treatment, and it will be unlikely that polishing treatment will cause corrosion.

With respect to a substrate obtained by the application of the chemical etching treatment and a substrate obtained by the application of the mechanical polishing treatment to such a substrate, a Co alloy magnetic layer was formed thereon by sputtering, and a carbon protective layer and a lubricant layer were formed further on the magnetic layer to obtain recording media (these recording media will be hereinafter referred to as glass media). Table 5 shows the results of the evaluation of the CSS characteristics, the head stick resistance and the S/N ratios of these glass media.

It is evident from Table 5 that the glass medium obtained by the chemical etching treatment followed by the polishing is superior in all of the CSS characteristics, the head stick resistance and the magnetic properties such as the S/N ratio to the glass medium obtained by the chemical etching treatment only.

Here, the CSS characteristics were determined by a method wherein a head was contacted to a glass substrate at a position 30 mm from the center of the substrate, then the glass substrate was rotated at a speed of 3,600 rpm, and the rotation and stopping were repeated 20,000 times, and then the static friction coefficient between the head and the media was measured. The head stick resistance was determined by a method wherein the static friction coefficient between the head and the media was measured by the above-mentioned method.

TABLE 5

| | CSS characteristics | Head stick resistance | S/N ratio (dB) | Missing bits (number/ surface) | Modulation errors (number/ surface) |
|---|---|---|---|---|---|
| Glass recording medium having chemical etching treatment applied, followed by mechanical polishing treatment | 0.2 | 0.15 | −29 | 0 | 0 |
| Glass recording medium having only chemical etching treatment applied | 0.4 | 0.18 | −27 | 0 | 0 |

It is evident from Table 5 that the magnetic recording medium wherein the glass substrate of the present invention was used, is excellent in the CSS properties, in the head stick resistance and in the magnetic properties such as the S/N ratio.

The mechanical polishing treatment is a kind of burnishing at the substrate stage, whereby stains or large protrusions which may be present on the substrate surface, may be removed, and thus the reliability of the substrate for the drive assembling manufactures in their attempt for a low flying height of the head i.e. for an increase of the recording density, will be increased.

For the production of the glass substrate for a magnetic disc of the present invention, it is possible to employ, other than the above-mentioned methods, another method wherein the glass surface is roughened by a mechanical means, and then the roughened surface is subjected to chemical etching treatment.

The following effects can be obtained according to the present invention.

(1) The glass substrate for a magnetic disc according to the present invention provides such effect that due to the proper roughness on the surface, the frictional force between the medium and the head will be reduced and the CSS properties and head stick resistance will be improved. Further, as the surface roughness is fine, it does not adversely affect the magnetic properties.

(2) Since the surface roughness is formed finely without anisotropy, even if the surface area per bit is reduced, no substantial deterioration of the S/N ratio or no substantial increase of defects will be brought about. Accordingly, high TPI (track per inch) and high BPI (bit per inch) are obtainable to make high density recording possible.

(3) The surface roughness provides an anchoring effect whereby the adhesion with the magnetic layer will be improved and the durability will be improved.

(4) The surface roughness is formed finely, and a low floating of the head will be possible, which is advantageous for high density recording.

(5) The glass substrate is less susceptible to deformation than the Ni-P plating layer on the aluminum substrate, and the protrusions of the roughened surface of the substrate are less likely to be damaged by collision with the magnetic head. Therefore, it is possible to produce a drive unit having high impact resistance and durability.

We claim:

1. A silicate glass substrate, at least 40% by weight $SiO_2$, for a magnetic disc having a finely and isotropically roughened surface, wherein the maximum height $R_{max}$ of the surface roughness is substantially not higher than 700 Å at a reference length of 250 μm and substantially not less than 50 Å at a reference length of 50 μm, wherein the tops of mountains constituting the surface roughness are rounded and said mountains are formed with pitches within a range of from 0.1-50 μm.

2. The glass substrate of claim 1, wherein said roughened surface is achieved by treating a glass surface with a chemical etching treatment.

3. The glass substrate of claim 1, wherein the mountains with rounded tops are formed by chemical etching of the substrate surface.

4. A process for producing a glass substrate for a magnetic disc, which comprises applying chemical etching treatment to a glass surface of silicate glass at least 40% by weight $SiO_2$ to form a surface roughness thereon wherein the maximum height $R_{max}$ of the surface roughness is substantially not higher than 700 Å at a reference length of 250 μm and substantially not less than 50 Å at a reference length of 50 μm, the tops of mountains which constitute said roughened surface being rounded, and having a pitch of from 0.1-50 μm.

5. The process according to claim 4, wherein the chemical etching treatment is conducted by contacting an aqueous solution containing a fluorine compound to the glass surface.

6. The process according to claim 4, wherein the chemical etching treatment is conducted by contacting a gas containing hydrogen fluoride to the glass surface.

7. The process according to claim 4, wherein the chemical etching treatment is conducted by contacting a gas containing from 0.01 to 10 mol % by hydrogen fluoride in an inert gas to the glass surface maintained at a temperature of from 5° to 90° C.

8. The process according to claim 7, wherein the gas containing from 0.01 to 10 mol % of hydrogen fluoride in an inert gas has a relative humidity of not higher than 70%.

9. A process for producing a glass substrate for a magnetic disc, which comprises applying chemical etching treatment to a glass surface of silicate glass at least 40% by weight $SiO_2$ to form a roughened surface thereon and then applying mechanical polishing treatment to the roughened surface to provide a surface roughness wherein the maximum height $R_{max}$ of the surface roughness is substantially not higher than 700 Å at a reference length of 250 μm and substantially not less than 50 Å at a reference length of 50 μm, the tops of mountains constituting said roughened surface being rounded, and having a pitch of from 0.1–50 μm.

10. The process according to claim 9, wherein the chemical etching treatment is conducted by contacting an aqueous solution containing a fluorine compound to the glass surface.

11. The process according to claim 9, wherein the chemical etching treatment is conducted by contacting a gas containing hydrogen fluoride to the glass surface.

* * * * *

UNITED STATES PATENT AND TRADEMARK OFFICE
CERTIFICATE OF CORRECTION

PATENT NO. : 4,833,001

DATED : May 23, 1989

INVENTOR(S) : Takashi Kijima et al

It is certified that error appears in the above-identified patent and that said Letters Patent is hereby corrected as shown below:

Title page Column 1, [73], Assignee: Please change to the following: --Assignees: Asahi Glass Company, Ltd., Tokyo, Japan; Komag, Inc., A CA Corp.--

Signed and Sealed this

Fourth Day of December, 1990

Attest:

*Attesting Officer*

HARRY F. MANBECK, JR.

*Commissioner of Patents and Trademarks*